June 8, 1954
C. GAUDIN
2,680,499
SHOCK-ABSORBER FOR MOTOR VEHICLES
Filed Dec. 22, 1948
2 Sheets-Sheet 1
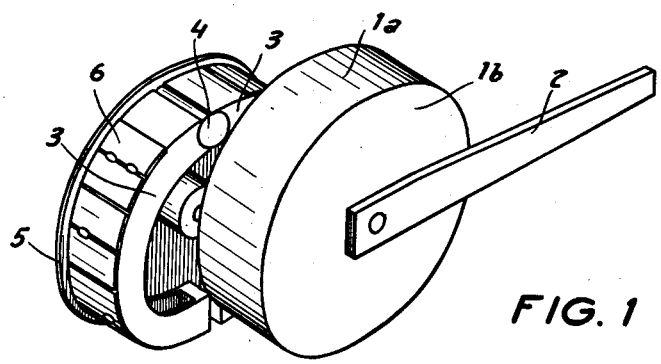
FIG. 1
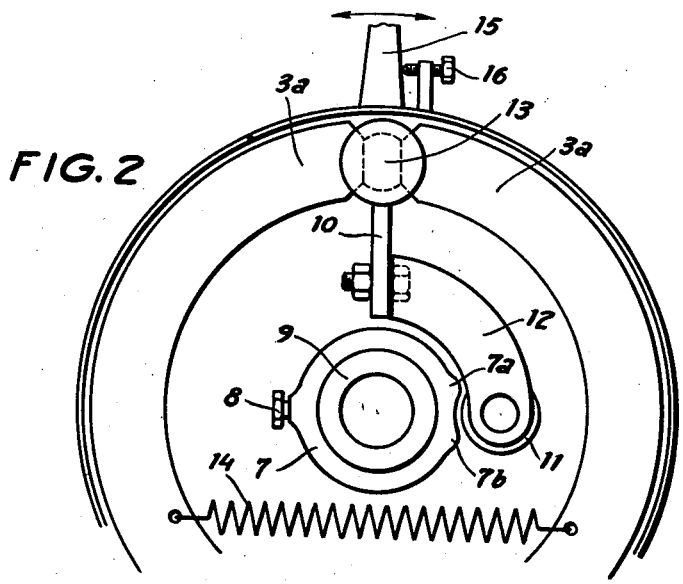
FIG. 2
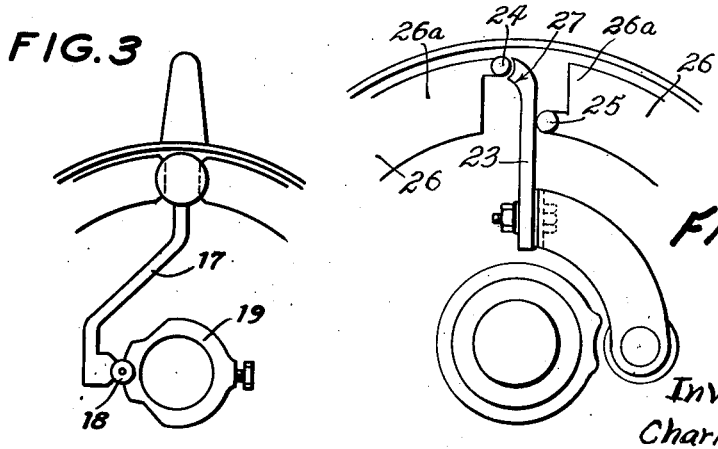
FIG. 3
FIG. 4
Inventor
Charles Gaudin
By Robert E. Burns
Attorney June 8, 1954   C. GAUDIN   2,680,499
SHOCK-ABSORBER FOR MOTOR VEHICLES
Filed Dec. 22, 1948   2 Sheets-Sheet 2

LEAF SPRING

Inventor
Charles Gaudin
By Robert E. Burns
Attorney

Patented June 8, 1954

2,680,499

UNITED STATES PATENT OFFICE 2,680,499

SHOCK-ABSORBER FOR MOTOR VEHICLES

Charles Gaudin, Saint Sulpice, Switzerland, assignor of one-half to Rene F. Sechaud, Geneva, Switzerland Application December 22, 1948, Serial No. 66,775

Claims priority, application Switzerland December 29, 1947

13 Claims. (Cl. 188—130)

This invention relates to shock-absorbers for motor vehicles and more particularly to shock-absorbers of the kind which comprises a brake drum and brake shoes operatively engaging therewith.

An important feature of the invention resides in the provision of at least one control lever operated by a member secured to the drum and acting on the shoes to adjust their spacing in such a way that braking takes place during the middle portion of each half of an oscillation of the vehicle.

The accompanying drawings represent, by way of examples, several forms of construction of shock-absorbers embodying the invention.

Fig. 1 is a perspective view of a shock-absorber wherein the brake drum is drawn apart to show the remainder of the device.

Figures 2 to 4 are cross sectional views perpendicular to the axis of the drum of optional constructions in which the control of the shoes spacing is performed by means of a central cam member and the control lever is housed within the drum.

Figure 6:
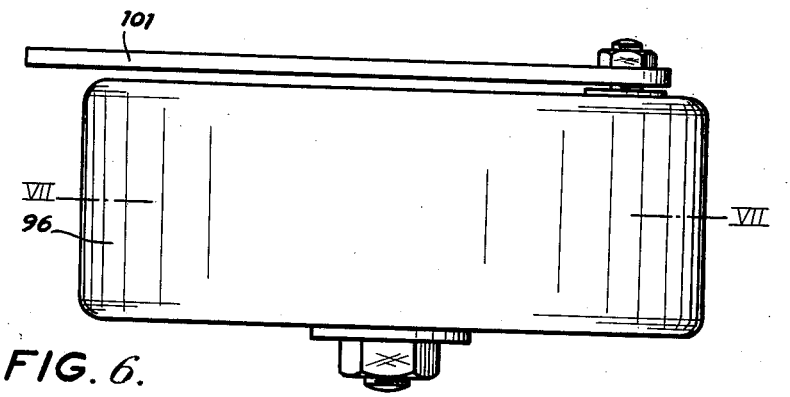
Fig. 6 is an elevational view of a further construction.

Referring to the Fig. 1, the drum of the shock-absorber is formed of a rim 1a and bottom wall 1b. The bottom wall carries a lever 2 intended to have its free end connected to a member secured to an axle of the vehicle. The shoes of the shock-absorber, indicated 3, are fulcrumed at 4 on a flange or base plate 5 which is secured to the vehicle frame. The relative movements of the axle with respect to the frame produce a rotation of the drum about the stationary portion of the shock-absorber. The shoes are provided with a lining 6 of leather or the like friction promoting material and exert a braking action on the drum. This braking takes place only during the middle portion of each half of the oscillation. To this end, as shown in Fig. 2, a central cam disk 7 having two lobes or projections 7a and 7b on its periphery, is secured by means of a screw 8 on a sleeve 9 secured to the drum. This cam disk 7 operates a control lever 10 consisting of a steel blade through the intermediary of a roller 11 carried by an arm 12 screwed to the lever 10. Lever 10 is secured to a cam 13 located between the free ends 3a of the shoes. Rotation of the cam 13 will cause the shoes to spread apart to perform braking. A return spring 14 tends to constantly contract the shoes. A link 15 secured to the cam 13 extends outwardly and is connected by means of a flexible cable with a handle located on the dashboard. This handle permits of adjusting the initial braking in the position of rest of the shock-absorber.

The operation of this shock-absorber is as follows:

The position of the cam disk 7 on the sleeve 9 is chosen so that when the vehicle is at rest, the roller 11 is located between the projections 7a, 7b of cam disk 7. The braking action exerted by the shoes on the drum is then comparatively slight and can be adjusted at will by means of the link 15 or of an adjusting screw 16. When the vehicle is moving, the oscillations of the axle cause rotation of the drum in either direction. At each oscillation one of the projections 7a, 7b displaces the roller 11 thus actuating the lever 10 and the cam 13; the shoes are then pushed apart and their braking action on the drum is increased. At the end of the oscillation, the projection 7a or 7b has passed beyond the roller 11, the braking relaxes again so that the shock-absorber is returned to its initial position under the influence of the vehicle suspension spring. The reduction of the braking action at the end of the oscillation avoids any jamming of the shock-absorber which may occur when the suspension spring is too soft to readily bring the shock-absorber back to rest position.

In the construction of Fig. 3, the control lever 17 is made of a single piece from steel strip ending in a boss 18 intended to cooperate with the central cam disk 19 whose shape differs from that of the cam 7.

In Fig. 4 the cam 13 is omitted. The steel blade of the control lever 23 is clamped between two bosses 24, 25 which are formed at the free ends 26a of the shoes 26. The boss 24 engages in a recess 27 provided on the outer end of lever 23 and boss 25 is pressed by the action of the return spring against the opposite edge of lever 23. The bosses 24 and 25 are offset from one another so that the action of lever 23 will cause the shoes to spread apart. The boss 24 could be carried by the steel blade 23 and engage in a recess provided on the free end 26a of a shoe.

Figure 5:
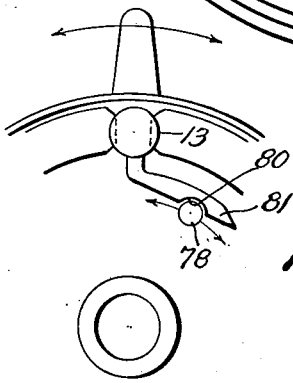
Fig. 5 is a similar sectional view of a further construction in which the control of the shoes spacing is brought about by means of a pin secured to the bottom wall of the drum, and the control lever is housed within the drum.

In the constructions shown in Fig. 5, the central cam has been omitted. A pin 78 is secured into the bottom wall of the drum. This pin is intended to cooperate with a control lever 81 secured to the cam 13. This control lever has a recessed portion 80 to receive the pin 78 when the shock-absorber is in position of rest. When an oscillation takes place in either direction, the lever 81 becomes displaced by the pin 78 thus promoting braking action; then at the end of the oscillation, the lever is returned back into its initial position, due to its contact edge being straight while the pin moves along an arc of circle.

Figure 7:
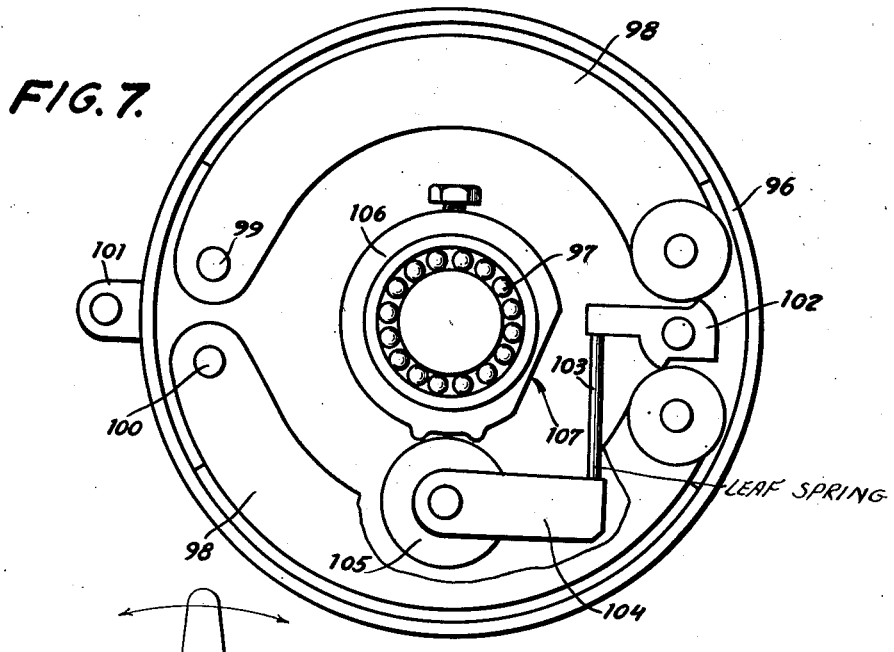
Fig. 7 is a cross-sectional view on line VII—VII of Fig. 6.

In the Figures 6 and 7, the drum 96 is mounted on a ball bearing 97. The shoes 98 are fulcrumed at 99 and 100 respectively. This arrangement reduces the risks of chattering. A spreading cam 102 located between the free ends of the shoes 98, spreads them apart when rotated. A lever 101 secured to the cam 102 allows an initial adjustment of the braking moment. The cam 102 is further secured to a leaf spring 103 secured to an arm 104 carrying a roller 105 which constantly contacts a central cam 106. This cam has a flattened portion 107 enabling the drum to be mounted without performing any braking action.

What I claim is:

1. A shock-absorber for motor-vehicles comprising a brake drum, shoes operatively engaging with said drum to provide a braking action, a control lever for spreading apart said shoes to increase the braking action, and a cam secured to said drum and operatively engaging said control lever, the shape of said cam being such as to increase the braking action only during the middle portion of each half on an oscillation, said action being decreased at both ends of said half-oscillation.

2. A shock-absorber as claimed in claim 1 wherein the control lever is located within the drum and wherein the cam has a recessed portion intended to allow the drum to be mounted on the shoes without said cam causing spreading apart of the shoes.

3. A shock-absorber as claimed in claim 1 wherein at least one part of the control lever is formed of a steel strip.

4. In a shock-absorber as claimed in claim 1, a cam located between the free ends of the shoes for spreading them apart, said cam being secured to the control lever.

5. In a shock-absorber as claimed in claim 1, two bosses provided on the free ends of the shoes and between which the control lever is engaged, whereby said shoes spread apart under the action of said lever.

6. A shock-absorber as claimed in claim 1, wherein the control lever is actuated by a pin secured to the bottom of the drum, at the inside of the latter.

7. In a shock-absorber as claimed in claim 1, a common axle on which the two shoes are pivoted.

8. A shock-absorber for motor-vehicles comprising a brake drum, shoes operatively engaging with said drum, a spreading cam for spreading apart said shoes to effect a braking action, a central cam secured to said drum, and a resilient means for operatively connecting said central cam with said spreading cam, the shape of said central cam being such as to effect the braking action only during the middle portion of each half of an oscillation.

9. In a shock-absorber for a vehicle having a body and an axle, a brake drum and a base plate, said drum and base plate being adjacent one another and oscillatable relative to one another, one of said members being adapted to be connected with said body and the other with said axle, brake shoes pivotally carried by said base plate and adapted frictionally to engage the drum to provide a braking action restraining oscillation of said base plate and drum, and means for pressing said shoes into engagement with the drum, said pressing means comprising a cooperating cam and cam follower, one of which is fixed to said drum and the other is carried by said base plate so that relative movement of the cam and cam follower is produced by relative oscillation of the drum and base plate, said cam having two lobes engageable with said cam follower to press said shoes against the drum, said lobes being spaced apart and disposed at mid points of the range of movement of the follower relative to the cam in each half oscillation of the drum and base plate from a neutral point, whereby in each half oscillation from a neutral point pressure of the shoes on the drum is first increased and is then decreased in an end portion of said half oscillation.

10. In a shock-absorber for a vehicle having a body and an axle, a brake drum and a base plate, said drum and base plate being adjacent one another and oscillatable relative to one another, one of said members being adapted to be connected with said body and the other with said axle, brake shoes pivotally carried by said base plate and adapted frictionally to engage the drum to provide a braking action restraining relative oscillation of said base plate and drum, and means for pressing said shoes into engagement with the drum, said pressing means comprising a central cam fixed to said drum, a cam follower pivotally carried by said base plate so that relative movement of the central cam and cam follower is produced by relative oscillation of the drum and base plate and means connecting said cam follower with said shoes, said central cam having two lobes engageable with said cam follower to press said shoes against the drum, said lobes being spaced apart and disposed at mid points of the range of movement of the follower relative to the central cam in each half oscillation of the drum and base plate from a neutral point, whereby in each half oscillation from a neutral point pressure of the shoes on the drum is first increased and is then decreased in an end portion of said half oscillation.

11. A shock absorber according to claim 10, in which the connections between the cam follower and the shoes comprise a resilient spring member.

12. In a shock-absorber for a vehicle having a body and an axle, a brake drum and a base plate, said drum and base plate being adjacent one another and oscillatable relative to one another, one of said members being adapted to be connected with said body and the other with said axle, brake shoes pivotally carried by said base plate and adapted frictionally to engage the drum to provide a braking action restraining relative oscillation of said base plate and drum, and means for pressing said shoes into engagement with the drum, said pressing means comprising a cam fixed to said drum, a lever pivotally mounted on said base plate, a cam follower carried by said lever and adapted to engage said cam, said cam follower being moved relative to said cam by relative oscillation of the drum and base plate, said cam having two lobes engageable with said cam follower to swing said lever about its pivot, and connections between said lever and said shoes to press said shoes against the drum when the cam follower rides over said lobes, said lobes being spaced apart and disposed at mid points of the range of movement of the follower relative to the cam in each half oscillation of the drum and base plate from a neutral point, whereby in each half oscillation from a neutral point pressure of the shoes on the drum is first increased and is then decreased in an end portion of said half oscillation.

13. In a shock-absorber for a vehicle having a body and an axle, a brake drum and a base plate, said drum and base plate being adjacent one another and oscillatable relative to one another, one of said members being adapted to be connected with said axle, brake shoes pivotally carried by said base plate and adapted frictionally to engage the drum to provide a braking action restraining relative oscillation of said base plate and drum, and means for pressing said shoes into engagement with the drum, said pressing means comprising a pin fixed to said drum at a point spaced from the center of oscillation of the drum and base plate, a cam lever engageable with said pin and pivotally carried by said base plate so that the cam lever is movable relative to the pin by relative oscillation of the drum and base plate, said cam lever having two lobes engageable with said cam lever to swing said lever about its pivot, and connections between said lever and said shoes to press said shoes against the drum when the lobes of the cam lever ride over said pin, said lobes being spaced apart and disposed at mid points of the range of movement of the cam lever relative to the pin in each half oscillation of the drum and base plate relative to one another from a neutral point, whereby in each half oscillation from a neutral point pressure of the shoes on the drum is increased and is then decreased in a subsequent portion of said half oscillation in the same direction.

References Cited in the file of this patent

UNITED STATES PATENTS

| Number | Name | Date |
|---|---|---|
| 1,095,571 | Hartford | May 5, 1914 |
| 1,117,972 | Bugatti | Nov. 24, 1914 |
| 1,822,188 | Zaparka | Sept. 8, 1931 |
| 1,951,702 | McCollum | Mar. 20, 1934 |

FOREIGN PATENTS

| Number | Country | Date |
|---|---|---|
| 982,856 | France | Jan. 31, 1951 |
| 49,558 | France | Jan. 29, 1939 |
| | (Addition to No. 838,654) | |